April 6, 1948.                W. D. TEAGUE                2,439,112
                              TWO-FILM CAMERA
                           Filed Dec. 30, 1944          2 Sheets-Sheet 1

WALTER D. TEAGUE
INVENTOR
BY
ATTORNEYS

April 6, 1948.  W. D. TEAGUE  2,439,112
TWO-FILM CAMERA
Filed Dec. 30, 1944  2 Sheets-Sheet 2

WALTER D. TEAGUE
INVENTOR
BY
ATTORNEYS

Patented Apr. 6, 1948

2,439,112

UNITED STATES PATENT OFFICE 2,439,112

TWO-FILM CAMERA

Walter D. Teague, New York, N. Y., assignor to Eastman Kodak Company, Rochester, N. Y., a corporation of New Jersey Application December 30, 1944, Serial No. 570,545

4 Claims. (Cl. 95—31)

This application relates to photography and more particularly to cameras designed to carry two separate films, either one of which may be used for making exposures. One object of my invention is to provide a camera in which there is a roll holder carrying two films, the roll holder being movably mounted to present either film for exposure. Another object of my invention is to provide a simple form of camera body in which a film carrier is mounted to move. Another object of my invention is to provide a roll holder movable inside of a camera body with a means on the outside of the camera body for changing from one film to another. A further object of my invention is to provide a camera with an oscillatable roll holder designed to carry two films and to provide a single opening in the camera body through which film may be loaded into either of the two film holders carried by the roll holder. Another object of my invention is to provide a double roll holder with a means for admitting light to one film at a time and means for preventing light from striking the film which is not being used for exposures. A still further object of my invention is to provide a camera with a single film winding device which is adapted to cooperate with either of the two films carried by the roll holder so that only the film being used can be moved past an exposure frame for successive exposures. Other objects will appear from the following specification, the novel features being particularly pointed out in the claims at the end thereof.

I am aware that cameras adapted to utilize two different films have been proposed, but so far as I know such cameras have not been provided with a simple means for oscillating a roll holder between two positions so as to utilize either one film or the other. Moreover, so far as I am aware, it is new to provide a roll holder so constructed that either one film or the other can be moved into an exposure position while holding the camera at an eye level for viewing an object to be photographed.

Coming now to the drawings wherein like reference characters denote like parts throughout:

Figure 1:
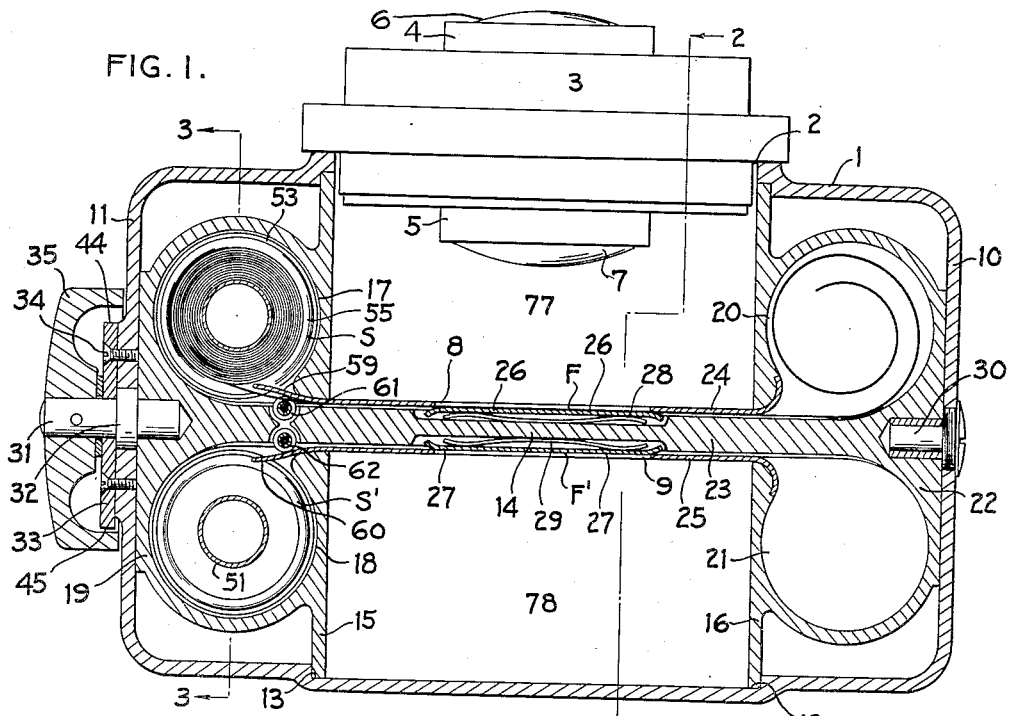
Fig. 1 is a longitudinal sectional view, parts being shown in elevation, of a camera constructed in accordance with and embodying a preferred form of my invention.

A preferred form of my invention may consist of a camera having a generally rectangular body portion 1 including a front opening 2 supporting a shutter 3; a front lens element 6 and a rear lens element 7 are adapted to form an image in an exposure frame 8, there being a similar exposure frame 9 which can be positioned behind the objective. The camera body 1 is provided with end walls 10 and 11 and inside the camera body there are two generally circular grooves or rabbets 12 and 13.

A roll holder designated generally as 14 preferably consists of a pair of disk-like walls 15 and 16 which may engage the rabbets 12 and 13 to form a substantially light-tight connection therewith. The roll holder also includes four film chambers, two each being carried by the disks 15 and 16. Spool chambers 17 and 18 are mounted in a wall portion 19 carried by the disk 15 and film chambers 20 and 21 may be carried by the wall 22, this portion of the roll holder being supported by the disk member 16.

Figure 2:
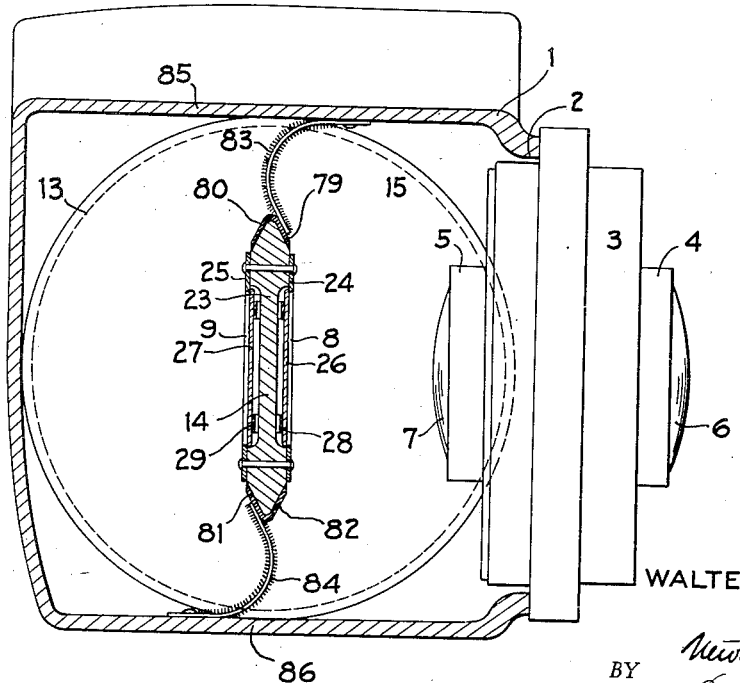
Fig. 2 is a section taken on line 2—2 of Fig. 1, certain parts being shown in elevation.

As best shown in Fig. 2 between the disk members 16 and 15 there extends a relatively narrow wall 23, this wall carrying two plates 24 and 25 on opposite sides, these plates having the openings 8 and 9 forming the exposure frames for the films F and F'. Pressure plates 26 and 27 thrust outwardly by springs 28 and 29 hold the films F and F' accurately against the exposure frames 8 and 9.

The roll holder 14 is mounted on a trunnion 30 carried by the end wall 10 and carries a shaft 31 having a shoulder 32 which may turn on the camera wall 11 being held in place by the plate 33 which is affixed to the camera wall 11 by a suitable means, such as screws 34. Thus the shaft 31 and the stud 30 pivotally support the roll holder so that it may swing to present either of the films F or F' in a position for exposure behind the lens. Since the shaft 31 is keyed to the roll holder and since a handle 35 is pinned to the shaft, by turning the handle the roll holder as a whole can be moved.

Figure 4:
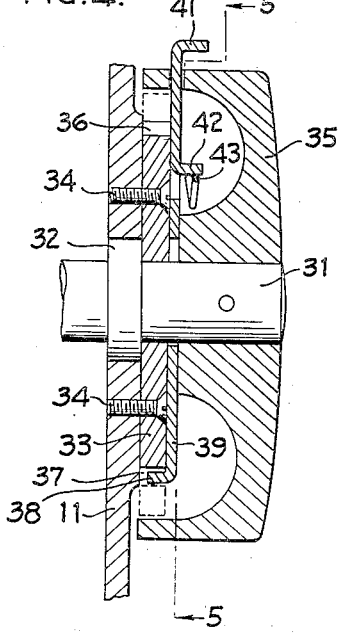
Fig. 4 is an enlarged section through the indexing handle and roll-positioning knob.
Figure 5:
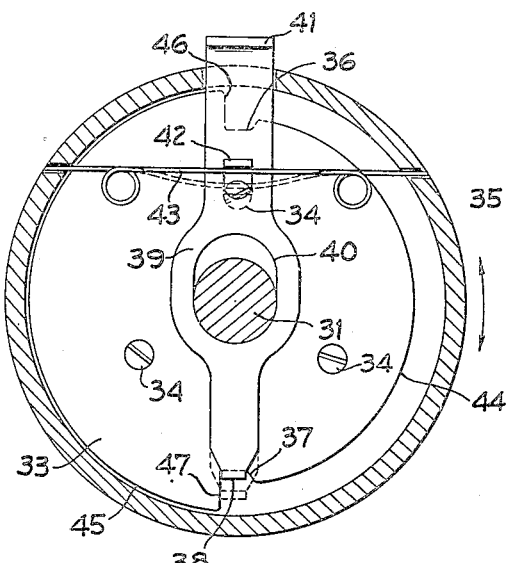
Fig. 5 is a view taken on line 5—5 of Fig. 4 showing the indexing knob and latch mechanism used with a preferred form of my invention.

In order to accurately position the roll holder for exposing either film I prefer to make the handle 35, as indicated in Figs. 4 and 5, both an indexing and latching handle. This can readily be accomplished in the following manner. Plate 33 is attached by screws 34 to the camera wall 11 and this plate is preferably constructed as shown in Fig. 5, that is it is provided with a pair of notches 36 and 37 arranged at 180° apart and these notches may be engaged by a downwardly-turned latch element 38 which is on the end of a slidable latch bar 39 having an opening 40 to slide about the shaft 31 and including a handle 41 on the outside of a knob for moving the latch element 38 from either of the two latch elements 36 or 37. An upwardly-turned lug 42 on the latch bar may engage a spring 43 so that the latch element 38 is normally held against either the latch element 36, the latch element 37 or the smooth periphery 44 of the plate 33. This surface forms a cam guide for holding the latch element 38 out of latching position until the roll holder reaches either of its two set positions in which a film is presented for exposure behind the camera objective.

Since the plate 33 has a large diameter 45 of a size to prevent the latch element 38 from riding around its periphery, the shoulders 46 and 47 form limiting stops to prevent the roll holder from being moved too far.

Thus it is only necessary in using the camera to press down on the handle 41 to release the latch element 38 from one of the cooperating latch elements of the disk 33, that is from latch element 36 or latch element 37. Handle 35 may then be turned until the desired latch elements are brought into engagement.

The film winding system is similar to that shown in Patent 2,336,278, Film winding apparatus, in the name of Joseph Mihalyi, granted December 7, 1943. It includes film wound on a single film spool S or S', the film spools being similar and being of the type including a core 51 having flanges 52 and 53 preferably formed with beads 54 and 55 extending around the periphery of the flanges. One flange 52 is provided with a square aperture 56 and the other end of the film spool is provided with a generally circular extension 58. The convolutions of film F or F' are wound upon the spool and are held by the spring of the film inside of the beads 54 and 55. However, when such a film spool is turned the end of the film will pass beneath a guide bar 59 which may be formed on the end of the plate 24 carrying the exposure frame 8. A similar guide plate 60 is formed on the plate 25.

By turning the film spool the end of the film will be propelled and curved by means of the rollers 61 or 62 so that the film may pass across the pressure plates and into the empty film chambers 20 or 21 as the case may be. It is customary to unwind the unexposed film into the empty film chambers and then to wind the film back one exposure at a time as may be required.

In order to wind the film the square film support 56A carries a gear 70, a similar gear 71 being carried on the winding shaft for the film spool carrying the film F'. Either of the gears 70 or 71 can be made to mesh with a pinion 72 normally thrust downwardly by a spring 73 into mesh with one of these gears. The pinion 72 is carried by a shaft 74 to which is pinned a winding lever 75 carrying a winding handle 76. When the parts are in the position shown in Fig. 3 this handle may be turned to wind film either to or from the film core 51. If it should be desirable to present the opposite film for exposure, the shaft 74 is raised against the pressure of spring 73 and the roll holder knob 35 is turned to present the opposite gear 71 which may be then meshed with the pinion 72. The spring 73 moves the pinion downwardly. It should be noticed that the roll holder movement is limited to 180°. I prefer to use this construction because it facilitates making a light-tight connection between the front chamber 77 shown in Fig. 1 behind the camera lens and the rear chamber 78 in which the film F' is exposed. I accomplish this by providing V-shaped walls 79 and 80 on the top of that part of the roll holder which extends between the disks 15 and 16 and similar walls 81 and 82 on the bottom of this same member. These walls are attached to contact with a pair of plush covered metal springs 83 and 84 carried by the top and bottom walls 85 and 86 of the camera body 1. These spring members extend all the way across between the walls 15 and 16 and the plush covering abuts the disk members 15 and 16 to form a substantially light-tight connection therewith.

Figure 3:
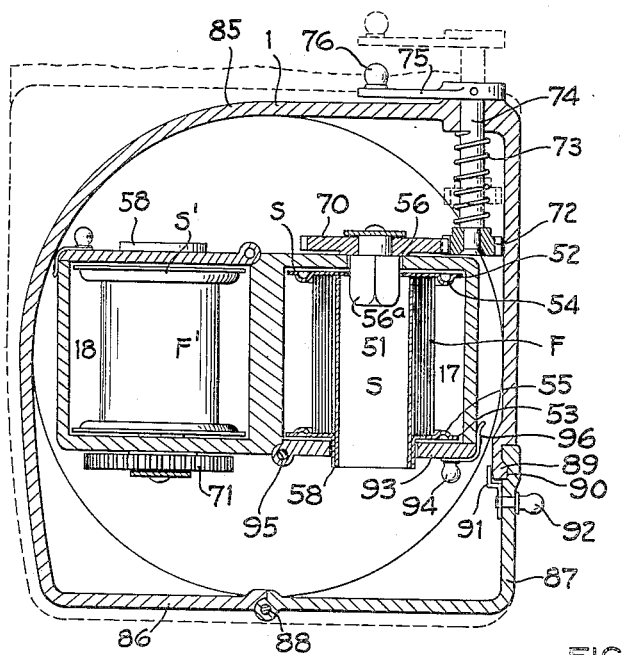
Fig. 3 is a view taken on line 3—3 of Fig. 1 illustrating the film winding mechanism which may cooperate with either of the two film spools carried by the roll holder.

In order to load film into the camera above described, I have provided a single opening in the camera body which may be covered by a door 87 best shown in Fig. 3. This door may be hinged at 88 to the camera body and it may have a tongue and groove connection 89 and 90 forming a light-tight connection around its edge. A latch member 91 may be operated by a handle 92, this latch normally holding the door in a closed position.

When, however, the latch is turned and the door is swung open an operator may open an inner door 93 by means of a handle 94 swinging it about the hinge 95 so as to release the film spool S. The same construction is used on both of the film spool chambers so that either of these chambers may be loaded through the same door 87 by properly positioning the roll holder in the camera body for the loading operation. If desired, a simple form of snap latch 96 may be used to hold the roll holder door closed as shown in Fig. 3.

With the camera above described the film can be loaded with two spools of film S and S' and ordinarily a user will prefer to provide one film spool with normal black-and-white film and the other film spool with color film such as is well known for making color slides and the like.

The operator after loading the film may expose all or any part of either film by merely turning the roll holder knob 35 so as to position the desired film behind the lens. Since it is only possible to wind film which is behind the lens and which is consequently interconnected, as through gears 71 and 72 with the film winding handle 76, only one film at a time can be exposed. Any time it is desired to expose the opposite film the operator merely disengages the gears 70 or 71 and the pinion 72 by drawing upwardly on the handle 76 so that the knob 35 can be turned by depressing the handle 41. These operations can be simply and quickly performed. Since the roll holder turns accurately on the shaft 31 and the stud 30, and since the exposure frames 8 and 9 are accurately positioned with reference to this axis, each of the films F and F' is always held accurately in the focal plane of the objective.

While I have described a preferred embodiment of my invention, it is obvious that various forms will suggest themselves to those skilled in the art without departing from my invention as defined in the following claims.

What I claim is:

1. A roll holding camera including, in combination, a camera body, a lens and shutter carried by the camera body, a roll holder oscillatably mounted in the camera body on an axis at right angles to the lens axis, said roll holder including a pair of exposure frames mounted back to back and equally spaced from the axis of said roll holder, film chambers at each end of each exposure frame, and means on the outside of the camera body and operably engaging the roll holder for moving the latter in the former to present either exposure frame behind the objective and shutter, said roll holder including two adjacent film spool chambers positioned back to back and each adapted to receive a film spool having a winding key opening at one end and a bearing at the other end, two winding shafts for engaging the winding key openings carried by the roll holder and extending in opposite directions.

2. A roll holding camera including, in combination, a camera body, a lens and shutter carried by the camera body, a roll holder oscillatably mounted in the camera body on an axis at right angles to the lens axis, said roll holder including a pair of exposure frames mounted back to back and equally spaced from the axis of said roll holder, film chambers at each end of each exposure frame, and means on the outside of the camera body and operably engaging the roll holder for moving the latter in the former to present either exposure frame behind the objective and shutter, said roll holder including two adjacent film spool chambers positioned back to back and each adapted to receive a film spool having a winding key opening at one end and a bearing at the other end, two winding shafts for engaging the winding key openings carried by the roll holder and extending in opposite directions and a film spool loading opening in the camera body opposite a film spool chamber through which a film spool may be moved to and from either winding shafts by properly positioning the roll holder.

3. A roll-holding camera including, in combination, a camera body, a lens and shutter carried by the camera body, a roll holder oscillatably mounted in the camera body on an axis at right angles to the lens axis, said roll holder including a pair of exposure frames mounted back-to-back and equally spaced from the axis of said roll holder, generally V-shaped edges on the exposure frame members extending throughout the length thereof, disks parallel to the lens axis at the ends of the exposure frames, generally circular ways on the camera body making a substantially light-tight connection with said disks, the width of the exposure frames being materially less than the diameter of said disks, and curved spring light-trapping members positioned to engage opposite walls of the V-shaped edges of the exposure frames between the disks to make a light-tight connection therewith.

4. A roll-holding camera including, in combination, a camera body, a lens and a shutter carried by the camera body, a roll holder oscillatably mounted in the camera body on an axis at right angles to the lens axis, said roll holder including a pair of exposure frames mounted back-to-back and equally spaced from the axis of said roll holder, generally V-shaped edges on the exposure frame members extending throughout the length thereof, disks parallel to the lens axis at the ends of the exposure frames, generally circular ways on the camera body making a substantially light-tight connection with said disks, the width of the exposure frames being materially less than the diameter of said disks, and curved spring light-trapping members positioned to engage opposite walls of the V-shaped edges of the exposure frames between the disks to make a light-tight connection therewith, the edges of the curved spring light-trapping members also having a substantially light-tight connection with portions of said disks of the roll holder.

WALTER D. TEAGUE.

REFERENCES CITED

The following references are of record in the file of this patent:

UNITED STATES PATENTS

| Number | Name | Date |
|---|---|---|
| 932,457 | Folmer | Aug. 31, 1909 |
| 1,718,739 | Jones | June 25, 1929 |
| 1,757,001 | Beidler | May 6, 1930 |
| 1,789,351 | Caps | Jan. 20, 1931 |
| 1,800,007 | Caps | Apr. 7, 1931 |
| 1,859,258 | Beidler | May 17, 1932 |
| 1,984,420 | Moulin et al. | Dec. 18, 1934 |
| 2,112,838 | Griffin | Apr. 5, 1938 |
| 2,245,606 | Rauch | June 17, 1941 |
| 2,315,284 | Thompson | Mar. 30, 1943 |